United States Patent [19]

Jaekel

[11] 4,217,931

[45] * Aug. 19, 1980

[54] ADJUSTABLE CHECK VALVE

[76] Inventor: Gunter Jaekel, 44 Coral Gable Dr., Weston, Ontario, Canada

[*] Notice: The portion of the term of this patent subsequent to Sep. 12, 1995, has been disclaimed.

[21] Appl. No.: 940,824

[22] Filed: Sep. 8, 1978

Related U.S. Application Data

[63] Continuation-in-part of Ser. No. 789,992, Apr. 22, 1977, Pat. No. 4,112,959.

[51] Int. Cl.³ .................... F16K 15/04; F16K 47/08
[52] U.S. Cl. .................................. 137/606; 137/539;
137/539.5; 137/503; 137/512; 137/514.5;
137/514.7
[58] Field of Search ............... 137/539, 539.5, 503,
137/506, 606, 514.5, 514.7, 512

[56] References Cited

U.S. PATENT DOCUMENTS

| | | | |
|---|---|---|---|
| 1,138,338 | 5/1915 | Whitney | 137/514.5 |
| 2,470,372 | 5/1949 | Roth | 137/539.5 |
| 2,593,522 | 4/1952 | Barnes | 137/514.5 X |
| 2,646,066 | 7/1953 | Nemetz | 137/506 X |
| 2,969,084 | 1/1961 | Raymond | 137/539.5 X |
| 3,234,959 | 2/1966 | Feinberg | 137/606 X |

*Primary Examiner*—William R. Cline
*Attorney, Agent, or Firm*—Ridout & Maybee

[57] ABSTRACT

A smoothly acting adjustable fluid flow check valve comprises an adjustably spring biased ball valve member, a piston upstream of the ball valve member and having a stem acting as an actuator for the ball valve member and as a further valving member actually controlling the volume of fluid passing through the check valve, the piston and ball valve member moving under the influence of a dashpot disposed so as to damp their movement. The valve may be incorporated into a conventional faucet structure.

7 Claims, 4 Drawing Figures

ADJUSTABLE CHECK VALVE

REFERENCE TO RELATED APPLICATION

This application is a continuation-in-part of my application Ser. No. 789,992 filed Apr. 22, 1977 for "Adjustable Check Valve", now U.S. Pat. No. 4,112,959.

FIELD OF THE INVENTION

This invention relates to adjustable check valves for use in fluid supply systems. Whilst particularly useful for providing valves or faucets for mixing water from hot and cold water supply systems, the valve of the invention is by no means confined to that application and may be used to control the flow of both liquids and gases.

BACKGROUND OF THE INVENTION & PRIOR ART STATEMENT

In U.S. Pat. No. 2,830,612 there is described an anti-condensation device for a flush tank in which hot water is injected into a cold water supply to the tank through a check valve and a restrictor orifice. I have experimented with this device and have found that whilst preventing condensation it leaves several problems unsolved. The form of check valve employed is very prone to chatter, resulting in a noise problem, and there is nothing to prevent hot water from entering the cold water supply in the event of a pressure drop in the latter. Furthermore, the device is not adjustable.

I am aware of the check valve structure disclosed in U.S. Pat. No. 2,044,629 to Parker in which two valve members are arranged in series, one of the valve members being movable relative to the other within a chamber forming part of the fluid path from inlet to outlet of the valve structure so as to provide a dashpot effect on opening or closing of the valve. I am also aware of U.S. Pat. No. 2,682,890 to May for a safety valve in where a piston operated by the pressure of fluid upstream of the valve acts as a lifter for the valve, and U.S. Pat. No. 2,646,066 to Nemetz for a check valve for lubrication systems in which a first valve member in the form of a piston acts as a lifter for a second ball-type valve. However, none of these valves operates or is constructed in the same manner as that now to be described, nor do they have the same purpose, which is here to provide a simple yet smoothly and silently operating adjustable check valve.

SHORT DESCRIPTION OF THE INVENTION

According to the present invention, a check valve comprises a valve housing having an inlet and an outlet, a valve seating in the housing defining a passage between inlet and outlet chambers defined in said housing, a ball valve seatable on the seating on the outlet side thereof, a compression spring urging the ball onto the seat, a spring abutment adjustably mounted in the housing, the spring acting between the ball and the abutment to apply an adjustable bias to said ball tending to retain it on said valve seat, a first piston having a path of movement in the passage defined by the valve seating, passageway means defined by the piston and extending from an inlet in the one end of the piston nearest the inlet to at least one outlet in the side of the piston so positioned that at one end of the path of movement of the piston the outlet is within the passage in the valve seating and at the other end of the travel of the piston is on the outlet side of the valve seat, the other end of the piston being engageable with the ball valve member, and dashpot means comprising a second piston, constrained to move conjointly with said ball and said first piston, and cylinder means receiving said second piston for movement relative to said housing, a leakage path being defined communicating said cylinder to control the rate of displacement of said piston in said cylinder. With this arrangement, although the primary closure of the valve is by the ball valve member, the principal fluid flow through the valve is through the passageway in the stem and the side outlet or outlets in the latter. The rate of flow through the valve is thus regulated by the piston, whose movements are damped to an extent determined by the magnitude of the leakage path past the dashpot piston, thus enabling any necessary degree of damping required to prevent chatter and erratic operation to be applied without restricting flow through the valve. The pressure drop occurring across the valve may be adjusted by moving the adjustable abutment, which may be the valve stem of a conventional faucet structure.

The valves may be used in pairs, for example in hot and cold water supplies to a flush tank or a sink, in which case they will act both accurately to proportion the hot and cold water supplied to the tank or sink and to prevent any communication between the hot and cold water systems.

SHORT DESCRIPTION OF THE DRAWINGS

A preferred embodiment of the invention is shown in the accompanying drawing, in which.

DESCRIPTION OF THE PREFERRED EMBODIMENTS

Figure 1:
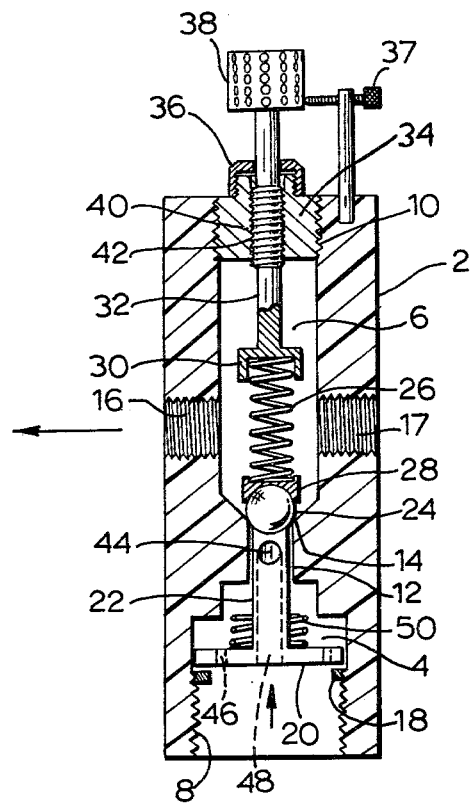
FIG. 1 shows a first embodiment of check valve in section.

The valve shown in FIG. 1 comprises a body 2, which may be formed of metal, or of a high strength moulded plastics material such as a glass loaded acetal resin such as is available under the trade mark DELRIN from DuPont. The body is formed with a bore from one end forming an inlet chamber 4 and a bore from the other end forming an outlet chamber 6, both bores having threaded portions 8, 10 respectively at their outer ends. The bores are connected by a further bore 12 forming a passage between the chambers 4 and 6 through a valve seat 14. A tapped side outlet 16 in the housing into the chamber 6 receives an outlet pipe (not shown) from the valve, whilst an inlet pipe (not shown) engages the threaded portion 8. An additional side orifice 17 may be provided for purposes to be discussed below. The threaded portion 8 also receives a retainer ring 18 which renders a piston assembly captive within a cylinder formed by the chamber 4, a second piston 20 supporting a first piston 22 which extends into and substantially closes the passage 12. The outer end of the piston 22 is recessed to engage a ball valve member 24 normally held in fluid tight engagement with the valve seat 14 by a spring 26 acting between a cup 28 resting on the ball and an abutment in the form of a cup 30 on the end of a stem 32.

The stem 32 has a screw threaded portion 42 engaging an internal thread 40 on a plug 34 which has an external thread engaging the thread 10. A gland nut 36 retains liquid tight packing around the stem 32, which has an operating knob 38 at its outer end. By means of the knob 38, the position of the cup 30 may be adjusted, thus altering the pressure applied to the ball 24 tending to keep it seated. A locking device as shown at 37, or of any other suitable alternative design may be used to retain a desired setting. The piston assembly has a passageway 48 extending from the side of the assembly nearest the inlet end of the valve through the first piston 22 to an outlet 44 in the side of the piston 22. Preferably there are two diametrically opposite outlets, which are normally masked by the seat 14. Small drillings 46 in the second piston 20 provide a leakage path between its opposite sides: they may be replaced by notches in the edge of the second piston 20 or by slightly reducing the diameter of the second piston so as to provide the desired leakage path. Interchangeable piston assemblies with calibrated drillings may be selected so as to provide desired forward flow characteristics. A spring 50 surrounds the stem 22 and is dimensioned so as to arrest the piston assembly at the end of its upward stroke. Other alternative means of cushioning the upward end of the piston stroke could be employed.

When a pressure differential is applied across the valve from inlet to outlet, sufficient for the differential fluid pressure applied directly or indirectly to the ball 24 to overcome the pressure applied thereto by the spring 26, the ball will rise until the spring is compressed so that the pressures applied to the ball are again balanced. If this results in the parts of the outlets 44 rising above the seat 14, fluid will pass from the inlet chamber to the outlet chamber through the passageway 48 at a rate determined both by how far the piston 22 can rise against the increasing pressure of the spring 26 and by how much the pressure drop across the valve falls: unless the spring pressure is low and the back pressure at the outlet 16 is low, the first piston assumes some intermediate position with the outlets 44 partly uncovered. Sudden movements or oscillations of the piston 22 are heavily damped by the dashpot formed by piston 20 and cylinder 4 since any such movements or oscillations require the displacement or induction of fluid from or into the portion of the cylinder formed by chamber 4 above the second piston 20 through the leakage path means 46 and any other leakage paths around the second piston 20 and the first piston 22. Since the flow through the valve is controlled by the interaction of the openings 44 and the seat 14, there is no sudden cut-off or commencement of flow as the ball 24 seats or unseats, and thus a further source of noisy operation is avoided, whilst additional damping at the fully open position of the valve is provided by the spring 50.

Figure 2:
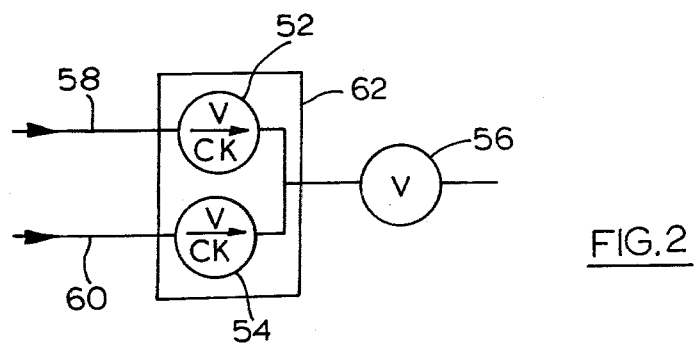
FIG. 2 is a diagram illustrating a use of the valves in accordance with the invention.

Referring to FIG. 2, the valve of the invention will frequently be used as one of a pair of valves 52, 54 upstream of some further valve 56, in order to feed controlled preset amounts of hot and cold water from separate hot and cold supplies 58, 60 to an outlet controlled by the single valve 56. One example already mentioned is the float controlled valve of a flush toilet, whilst other examples are spray nozzles for watering indoor plants where it is desired to avoid the shock of applying very cold water during winter, and shower heads where it is desired to avoid having to set up a predetermined water mix to provide a desired temperature each time the shower is used. In all of these cases, single valve control of the mixed water involves the danger of water from one of the hot and cold systems entering the other unless check valves are provided. The adjustable check valve of the invention enable both the check valve and temperature control functions to be carried out simultaneously in valves which are simple to construct yet stable and quiet in operation. The valves 52 and 54 may have a common housing 62.

The orifice 17 may be used to accommodate a connection to a device 18, which may be a pressure gauge, a pressure switch, or means for introducing additives into fluids leaving the valve. Normally speaking, the valve of the invention will be used in series with and upstream of some further valve, such as the float valve of a flush tank or the control valve of a watering or dispensing valve. The pressure in the outlet chamber 6 will alter according to whether this downstream valve is open or closed, and the pressure gauge or switch will respond to such changes to provide indication or control function. If a dispensing device for additives is used, this may also be pressure controlled so as only to release additives when the pressure in the chamber 6 falls, thus indicating that the downstream valve is open. Such a dispensing device could be another valve in accordance with the invention.

Whilst in the embodiment described above, the valve body is of moulded plastics and the remaining parts are preferably of stainless steel, the simple construction of the valve means that it can readily be constructed from alternative materials having appropriate anticorrosive or heat resisting properties if corrosive or very hot fluids are to be handled. Subject to suitable calibration of the leakage path past the second piston, the valve works equally as well with gases as with liquids, and will work in any attitude.

Figure 3:
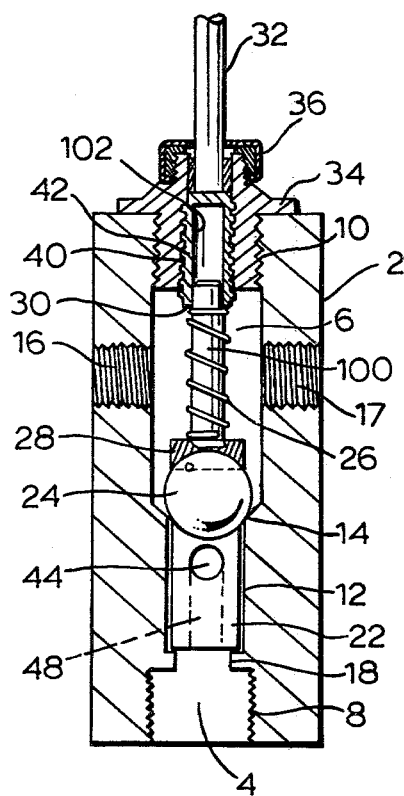
FIG. 3 shows a modified form of check valve in section.

Referring now to FIG. 3, a modified version of the valve of FIG. 1 is shown, in which the same reference numerals indicate similar parts where applicable. As compared with the embodiment of FIG. 1 the piston 20 is omitted, together with the associated cylinder portion of chamber 4 and the spring 50. The abutment 18 is formed integrally with the body and acts directly of the piston 20. The spring 26 is located by a second piston 100 which extends from a spring abutment formed by the cup 28 into a cylinder 102 formed within the threaded portion 42 of the stem 32. The fit between the second piston 100 and the cylinder 102 is such that a leakage path exists between the cylinder and the remainder of the housing such as to permit damped movement of the piston in and out of the cylinder, thus providing a dashpot assembly. The second piston acts through the cup 28 on the ball 24 and thence on the first piston 20 so as to damp the movements of these latter parts in the same manner as the piston 20 in the previous embodiment. However, manufacture of the valve is simplified since the abutment 18 is now integral with the body, and all of the parts may be assembled into or removed from the housing from one end and without the necessity for disconnecting the valve from any associated pipework connected at threaded apertures 16, 17 and 4.

Figure 4:
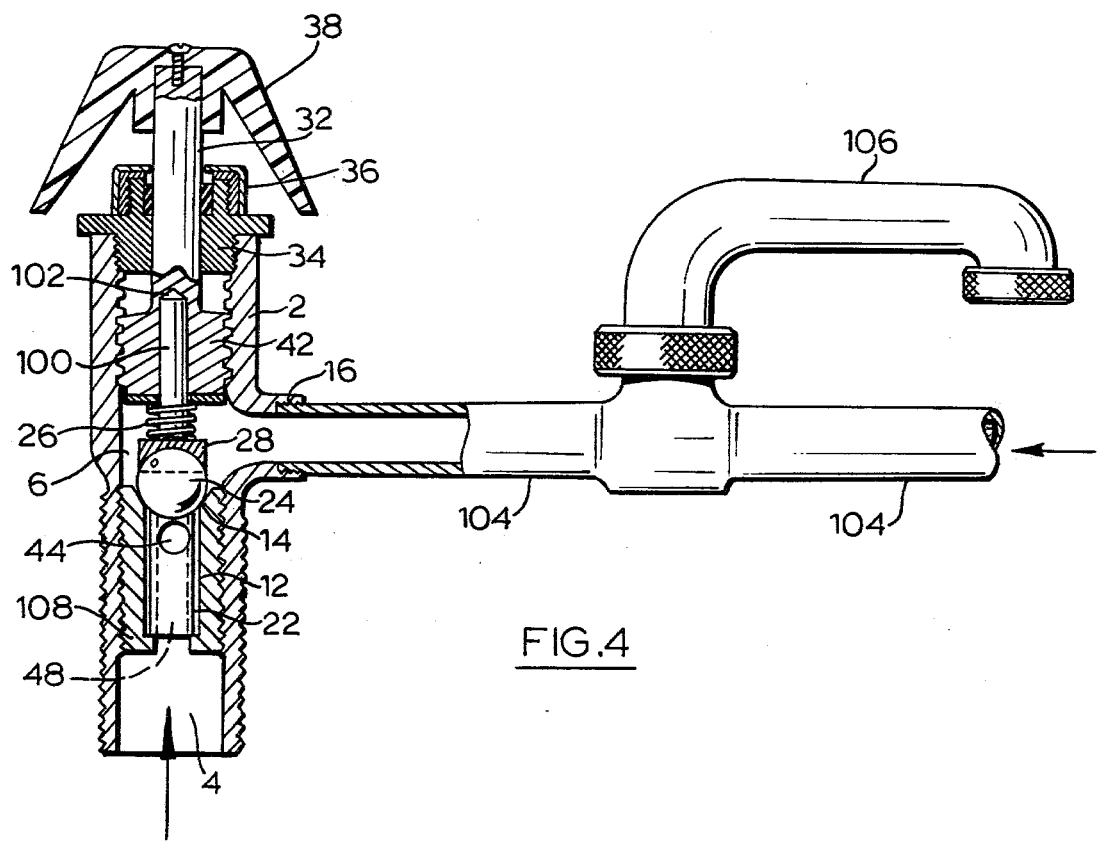
FIG. 4 shows a valve according to the invention incorporated in a mixer tap for a sink.

FIG. 4 shows a further modification of the valve incorporated into the body of conventional tap or faucet, the whole of the original structure of the latter being retained except for the seating, the washer and the washer carrier. The same reference numerals are utilized in FIG. 4 as in FIGS. 1, and 3, wherever applicable. The stem 32 and threaded portion 42 as well as the plug 34, the gland 36, the knob 38, the body 2 and the outlet 16 are formed by parts of a conventional faucet structure, which itself may form part of a conventional mixer tap together with a further faucet structure (not shown), connection pieces 104 and a swivel outlet 106. The seat 14, the abutment 18 and the bore 12 are defined in a screw-in insert 108 which replaces a conventional screw-in seat, and the conventional washer and carrier is replaced by the piston 22, the ball 24, the spring 26, the cup 28, and the piston 100, the cylinder 102 for the piston being formed by the existing bore for receiving the stem of the washer carrier. Operation is the same as in the previous embodiment. As compared to a conventional faucet structure, the troublesome washer is eliminated, a check valve action is provided which positively prevents any mixing of water from the hot and cold supplies, and the dashpot action provided by the piston and cylinder 100 and 102 prevents hammer or chatter. Since the ball 24 is free to rotate, and will constantly reform the seat 14 when pressed down onto the latter as the stem 32 is screwed down to close the valve, leakage problems should be substantially eliminated. Moreover, a wide range of existing faucet structures can readily be converted to the structure of the invention merely by replacement of those parts which are usually in any event subject to replacement during the life of a faucet.

I claim:

1. A check valve comprising a valve housing having an inlet and an outlet, a valve seating in the housing defining a passage between inlet and outlet chambers defined in said housing, a ball valve seatable on the seating on the outlet side thereof, a compression spring urging the ball onto the seat, a movable abutment mounted in the housing and comprising a stem having a threaded portion rotatable in a thread defining means in the body and extending out of the body through a gland attached to the latter, the spring acting between the ball and the abutment to apply an adjustable bias to said ball tending to retain it on said valve seat, a first piston having a path of movement in the passage defined by the valve seating, passageway means defined by the piston and extending from an inlet in the one end of the piston nearest the inlet to at least one outlet in the side of the piston and so positioned that at one end of the path of movement of the piston the outlet is wholly within the passage in the valve seating and obturated by the latter and at the other end of the travel of the piston is on the outlet side of the valve seat, the other end of the piston being engagable with the ball valve member, and dashpot means comprising a second piston, constrained to move conjointly with said ball and said first piston, and cylinder means receiving said second piston for movement relative to said housing, a leakage path being defined communicating with said cylinder to control the rate of displacement of said piston in said cylinder.

2. A check valve according to claim 1, wherein the first and second pistons are integral and said cylinder is formed in the housing on the inlet side of the valve seat.

3. A check valve according to claim 1, wherein the first and second pistons are separate, and the second piston acts on the ball in opposition to the first piston, said spring acting between said stem and an abutment on said second piston.

4. A check valve according to claim 3, wherein the cylinder is formed in the threaded portion of the stem.

5. A check valve according to claim 3, wherein the check valve is a faucet, the valve seating is removable, and the valve housing, the stem forming the movable abutment, the thread defining means and the gland are parts suited for a faucet of the kind in which the stem would normally be used to force a washer on a carrier entering a bore in the stem onto a removable valve seating in the housing.

6. A check valve according to claim 1, 3 or 4, incorporated in an assembly with a similar check valve and a further valve, the inlets of the check valves being connected to hot and cold water supply lines respectively, and their outlets both being connected to the inlet of said further valve.

7. A repair kit for a faucet of the kind in which a stem having a threaded portion rotatable in a thread defining means in a housing and extending out of the housing through a gland attached to the latter is normally used to force a washer on a carrier entering a bore in the stem onto a removable valve seating in the housing, said kit comprising a valve seating for insertion in the housing, a ball valve seatable on the seating on an outlet side thereof, a first piston for movement in a passage defined by the valve seating, passageway means being defined by the piston and extending from an inlet in the one end of the piston to at least one outlet in the side of the piston so positioned that at one end of the path of movement of the piston within the passage the outlet is wholly within the passage within the valve seating and obturated by the latter and at the other end of the travel of the piston in the passage is on the outlet side of the valve seat, the other end of the piston being engagable with the ball valve member, dashpot means comprising a second piston separate from the first piston and engagable with the ball valve in opposition to the first piston, and a compression spring engagable between said stem of the faucet and an abutment on said second piston, said first and second pistons, the ball and the spring being configured to replace the washer and carrier normally employed in a faucet for which the kit is intended.

* * * * *